United States Patent
Barber et al.

(10) Patent No.: US 9,016,498 B2
(45) Date of Patent: Apr. 28, 2015

(54) STORAGE TANK CONTAINING A BLACK POLYETHYLENE INNER LAYER

(71) Applicants: Richard Barber, Georgetown, TX (US); Sean Barber, Round Rock, TX (US)

(72) Inventors: Richard Barber, Georgetown, TX (US); Sean Barber, Round Rock, TX (US)

( * ) Notice: Subject to any disclaimer, the term of this patent is extended or adjusted under 35 U.S.C. 154(b) by 0 days.

(21) Appl. No.: 13/919,565

(22) Filed: Jun. 17, 2013

(65) Prior Publication Data

US 2014/0008372 A1 Jan. 9, 2014

Related U.S. Application Data

(60) Provisional application No. 61/668,216, filed on Jul. 5, 2012.

(51) Int. Cl.
| | |
|---|---|
| *B65D 88/08* | (2006.01) |
| *B65D 90/02* | (2006.01) |
| *B29D 22/00* | (2006.01) |
| *B29C 41/04* | (2006.01) |
| *B29C 41/20* | (2006.01) |
| *E03B 3/02* | (2006.01) |

(52) U.S. Cl.
CPC .............. *B65D 88/08* (2013.01); *B65D 90/022* (2013.01); *B29D 22/003* (2013.01); *B29C 41/04* (2013.01); *B29C 41/20* (2013.01); *E03B 3/02* (2013.01)

(58) Field of Classification Search
CPC ........ B32B 27/08; B32B 27/40; B32B 27/28; B32B 27/06; B65D 25/14; B65D 25/54; B65D 81/38; B65D 81/3823; B65D 81/3816; B65D 81/3813; B65D 81/3839; B65D 81/3846; B65D 81/3837
USPC ............. 220/62.22, 62.11, 62.13, 62.12, 665, 220/662, 567.1, 62.15, 565, 592.26, 592.25, 220/592.2, 592.21; 215/13.1, 12.2, 12.1; 428/36.5
See application file for complete search history.

(56) References Cited

U.S. PATENT DOCUMENTS

| | | | | |
|---|---|---|---|---|
| 2,331,097 | A * | 10/1943 | Watter | 220/734 |
| 3,207,358 | A * | 9/1965 | Fliss | 219/385 |
| 3,394,841 | A * | 7/1968 | Anderson | 220/645 |
| 3,606,958 | A * | 9/1971 | Coffman | 220/62.22 |
| 4,004,706 | A * | 1/1977 | Guldenfels et al. | 220/586 |
| 4,519,154 | A * | 5/1985 | Molari, Jr. | 40/615 |
| 5,023,120 | A * | 6/1991 | Akao | 428/35.9 |
| 6,607,826 | B1 * | 8/2003 | Hatch | 428/343 |
| 2004/0142188 | A1 * | 7/2004 | Peet | 428/457 |
| 2004/0247805 | A1 * | 12/2004 | Eisner | 428/34.1 |

* cited by examiner

*Primary Examiner* — Robert J Hicks

(57) ABSTRACT

Black polyethylene storage tanks are an inexpensive and effective way to store water and simultaneously inhibit algae growth. However, based on other considerations, it may be desirable to use a storage tank with a non-black color. By producing a polyethylene water storage tank with a black inner layer and a non-black outer layer, the desire to inhibit algae growth and the desire to have a non-black exterior can both be met.

7 Claims, 6 Drawing Sheets

STORAGE TANK CONTAINING A BLACK POLYETHYLENE INNER LAYER

BACKGROUND OF THE INVENTION

As the availability of potable drinking water diminishes, it is becoming more and more necessary to utilize alternate sources of water to supply the needs of a household. One readily available and easy to collect alternate source of water is rainwater. Using appropriately configured gutters, the water shed off of a roof can be directed into water storage tanks to collect many gallons of water over a short period of time. For example, 1 inch of rain over a 1000 ft$^2$ of roof surface corresponds to over 600 gallons. On a rainy day, a light rain of 0.1 inches per hour might fill a 1000-gallon tank.

There are various means for storing water, but a preferred method for residential water storage is the use of a polyethylene tank. All polyethylene tanks are made from virgin polyethylene has been approved by the United States Food & Drug Administration for use with drinking water. They are also durable, relatively inexpensive, and available in a wide variety of colors. These properties make them an ideal choice for many residential users.

Proper use of a water storage tank includes addressing the problem of algae growth, which is a common problem associated with standing water. If left unchecked, algae growth may make the stored water unsuitable for its intended purpose. Thus, there is a need to prevent algae growth within water storage tanks. The growth rate of algae can be inhibited by limiting the water's exposure to ultraviolet radiation. Because most water storage tanks are placed outdoors, this generally means being exposed to sunlight.

The ability of a polyethylene tank to block ultraviolet radiation is dependent on the color of the tank. The darker the color of the tank, the more ultraviolet radiation that is blocked. Therefore, a black polyethylene tank would provide the best ultraviolet radiation protection and best inhibit the growth of algae. However, for a variety of reasons, a user might find that a black water storage tank is unacceptable. In some cases, a home owner's association limits the color of storage tanks. In some situations, the user just insists on having a non-black storage tank. Regardless of the reason, using a single-layer non-black polyethylene storage tank will result in accelerated algae growth. Thus, there is a need to provide water tanks of a variety of colors that still inhibit the growth of algae. By providing a polyethylene tank with a black inner layer and a non-black outer layer, a user can select a water storage tank color and still obtain improved algae inhibiting properties.

SUMMARY OF INVENTION

Using a modified molding process, a multi-layered storage tank can be produced with different colored external layers with an internal layer of black polyethylene. By combining layers of different materials, the properties of these materials can be combined into a single storage tank with advantages corresponding to the chosen materials.

DETAILED DESCRIPTION

Figure 1:
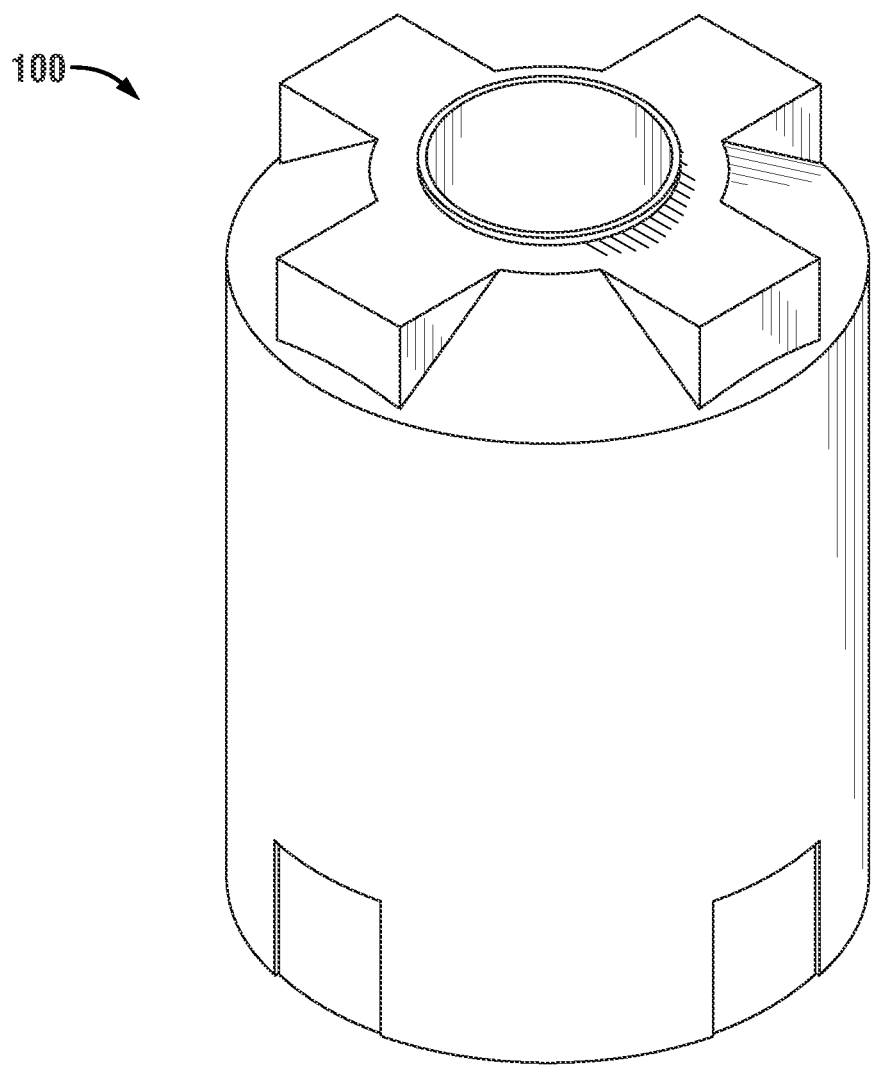
FIG. 1 is an example of multi-layered water storage tank

This disclosure can be understood in the context of the following examples. However, what follows is merely exemplar and not intended to define the scope of this patent, which is defined by the claims.

At a very high level, producing a rotation-molded plastic structure involves heating and rotating polyethylene resin within a mold until the resin heats up and coats the interior of the mold. The mold is then cooled until the plastic structure is ready for extraction. If the process works correctly, the resulting structure should have the shape of the mold with a thickness and color determined by the mold design and material weight.

One of the important steps in creating a rotation-molded structure is calculating the proper length of time to leave the mold in the oven (i.e., "curing time"). The proper curing time depends on a number of factors including, but not limited to, the shape of the mold, the quantity of resin, the type of resin, and the color of the resin.

In the absence of pigment, the natural color of polyethylene resin is an off-white color. In order to change the color of the resulting plastic structure, pigmented resin can be used. It may be possible to obtain resin that already contains a particular pigment color. Alternatively, pigment can be added to natural resin using a high-speed mixer. In either case, pigmented resin will change the color of a resulting plastic structure in accordance with its pigmentation. In addition to affecting the color of the resulting structure, resin color also changes the curing time. Darker pigmented resin cures faster than lighter pigmented resin.

The wall thickness of a plastic structure depends on the quantity of resin used, which is usually measured in pounds. Generally, adding more resin results in thicker walls and removing resin results in thinner walls. In addition to affecting wall thickness, increasing the quantity of resin also increases the curing time and vice versa Resins are provided in what are commonly called "powder" for use in molding processes. Powder sizes are measured in terms of mesh. A lower mesh number means larger particles. For example, 35 mesh powder has larger particles than 50 mesh powder. Using a higher mesh results in a shorter curing time as compared to using lower mesh.

Different materials have different curing times. For example, nylon generally takes longer to cure than a similar amount of polyethylene. The specific properties of the material used will affect the curing time as well as the dependency of the other factors discussed above.

The process of forming a rotation-molded plastic structure requires the use of a mold with an interior surface corresponding to the outer surface of the desired plastic structure. The mold should be constructed of a material that will maintain a constant shape with minimal expansion during the curing process. The mold should also be sufficiently durable for repeated use in the production of identical plastic structures. In order to shape and cure the contents of the mold, the mold should also be comprised of a heat conductive material.

During the rotational-molding process, the mold should be rotated from the beginning of the curing time until the completed plastic structure is ready to be removed. During the curing process, the resin powder softens and then spreads over the inner surface of the mold. The rotation of the mold keeps the resin from settling into one spot. The precise curing time is determined by a number of factors including, but not limited to, the quantity of resin, the pigmentation of the resin, the shape of the mold, and the temperature of the oven.

After the curing process has completed, the mold is put in a cooling phase to lock the melted resin into the shape of the mold. Because the resin is still soft upon exiting the oven, it must continue to be rotated during the cooling process. Using air circulation and possibly a water mist, the mold can be cooled to a workable temperature in a relatively short amount of time.

Once the mold has sufficiently cooled, the plastic structure can be removed from the mold. If performed properly, the resulting structure should have the same shape as the interior of the mold and possess a thickness and color consistent with the pigmentation and quantity of resin. The process described above is effective for producing a rotation-molded structure with a single layer The above process can be modified by adding additional resin to the mold during the curing process using a dropbox, which is an insulated resin container with a release valve. The release valve may be spring loaded for ease of opening. The dropbox can be attached to the mold via an access port in the mold structure. The dropbox and the mold are connected in such a manner that when the release valve on the drop box is opened, resin within the dropbox can flow into the mold. The dropbox is sufficiently insulated that its resin contents will not cure within the dropbox even when the dropbox is within an oven and attached to the mold.

As discussed above, curing time is inversely proportional to the darkness of the pigmented resin. Accordingly, by beginning the curing process with lightly-pigmented resin and adding darkly-pigmented resin via a drop box, the curing times of the colors can be matched such that the entire structure cures by the end of the cycle. Moreover, because the lightly-colored resin has been partially cured within the mold prior to introduction of the darkly-pigmented resin, it has had the opportunity to coat the inner surface of the mold. When the darkly-pigmented resin is added to the mold, the lightly-pigmented resin acts as a mold for this new layer.

FIG. 1 illustrates a polyethylene storage tank comprising multiple layers. Storage tank 100 is one possible shape of a multilayer polyethylene water tank. Tank 100 contains a black polyethylene inner layer and one or more outer layers. The inner layer contacts any stored water or other consumable fluid. The outer layers are isolated from the stored water and can serve any number of other purposes including, but not limited to aesthetic coloring and insulation.

Figure 2:
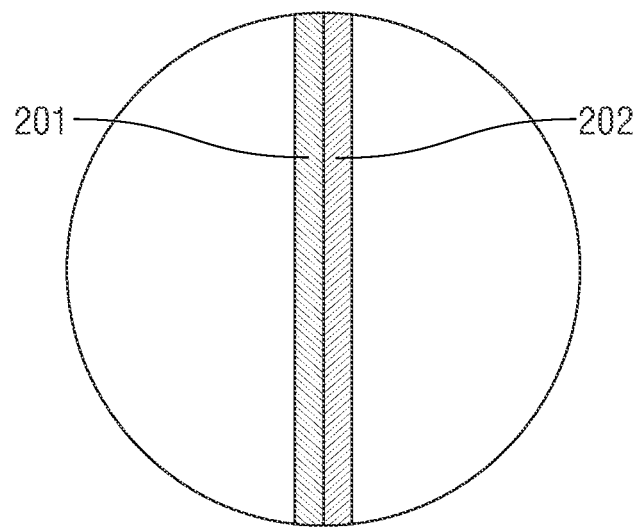
FIG. 2 is an illustration of the wall of a two layer water storage tank.

FIG. 2 illustrates a cross-section of a two-layer plastic wall, such as the wall of storage tank 100. Layer 201 is the outer layer and 202 is the inner layer. In this embodiment, layer 201 is comprised of a white-pigmented polyethylene and layer 202 is comprised of black-pigmented polyethylene. However, layer 201 can also be comprised of different colors and materials including, but not limited to, nylon, polypropylene, or crosslink materials in addition to white-pigmented polyethylene. The resistance to ultraviolet penetration is determined by the combination of layers 201 and 202. However, the visual appearance of a corresponding tank, such as tank 101 is largely controlled by the color of exterior layer 201. Accordingly, a two-layer plastic storage tank can provide ultraviolet protection greater than that of a wall comprised solely of layer 201 while providing the outward appearance of layer 201

Figure 3:
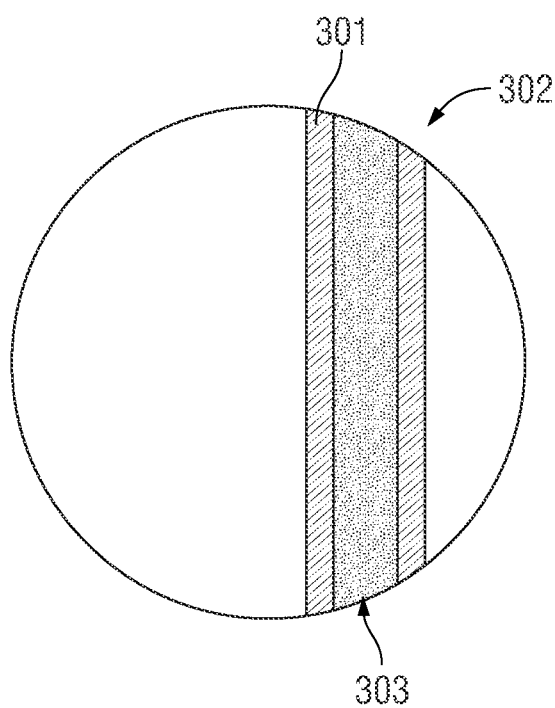
FIG. 3 is an illustration of the wall of a three-layer water storage tank.

FIG. 3 illustrates a cross-section of a three-layer plastic wall, such as the wall of storage tank 100. Layer 301 is the outer layer, layer 302 is the inner layer, and layer 303 is the middle layer. In this embodiment, layer 301 is comprised of a white-pigmented polyethylene and layer 302 is comprised of black-pigmented polyethylene. Layer 301 can also be comprised of different colors and materials including, but not limited to, nylon, polypropylene, or crosslink materials in addition to white-pigmented polyethylene. In this embodiment, layer 303 is comprised of closed cell white-pigmented polyethylene foam. In addition to the properties of the wall illustrated in FIG. 2, the addition of layer 303 provides additional ultraviolet protection as well as insulation.

Figure 4:
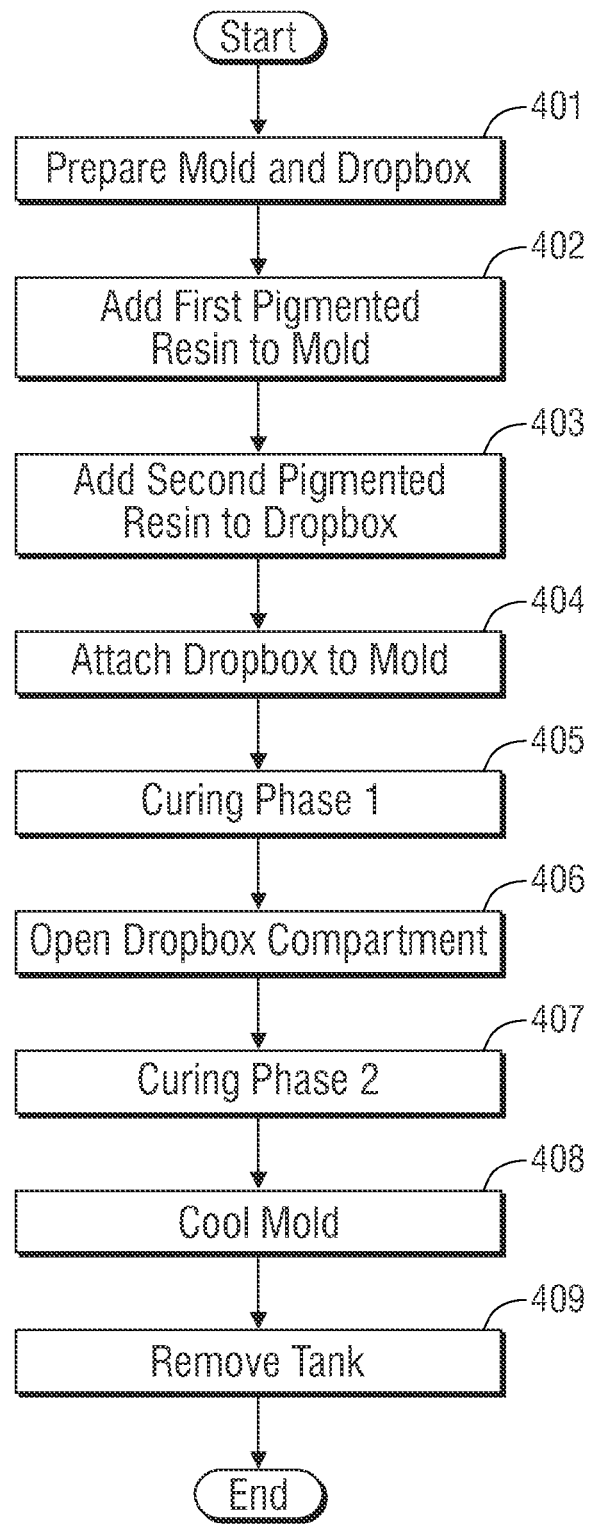
FIG. 4 is a diagram illustrating the steps necessary to manufacture a two-layer storage tank.

FIG. 4 illustrates a process that can be used to construct a multilayer storage tank such as 100. Specifically, FIG. 4 describes steps in the process of producing a two-layer water tank. By way of example and not limitation, the steps shown in FIG. 4 will be discussed in the context of a specific embodiment for producing a 100-gallon tank of the type of shown in FIG. 1 with a white-pigmented polyethylene outer layer and a black polyethylene inner layer. The values, equipment, configurations and materials discussed below are examples and do not define the scope of this patent, which is defined by the claims. Based on this disclosure, a skilled artisan could apply this technique to different colors of resin, different resin powder size, different tank shapes, different tank sizes, and different layer compositions without undue experimentation.

Step 401 includes preparing the mold and dropbox. In this embodiment, the mold corresponds to the shape of the storage tank shown in FIG. 1. This may involve using a water hose, air hose, or other mechanism to remove any residual plastic or other containments that might the adversely affect the rotational molding process. The dropbox is also prepared in a similar manner for use in the disclosed rotational molding process.

Step 402 involves adding a first resin to the mold. This first resin will form the outer layer of the resulting structure and will correspond to layer 201 in FIG. 2. If the outer layer is polyethylene, then step 402 involves adding pigmented polyethylene resin powder. Step 402 also includes closing the mold with the first resin inside. The quantity of resin comprising the first resin is based on the characteristics of the mold, and the desired thickness of the resulting plastic structure. In this embodiment, the first resin comprises 44 pounds of white-pigmented 35 mesh resin, which would be added to the mold in step 402.

Step 403 involves adding a second pigmented resin to the dropbox. The second pigmented resin corresponds to layer 202 in FIG. 2. When the second resin is added to the dropbox, the port on the dropbox should be closed so that the second resin will stay within the dropbox until deployed. Step 403 also includes closing any other openings in the dropbox. The overall thickness of a resulting plastic structure depends on the quantity of the second resin as well as the quantity of the first resin. In this embodiment, the second resin comprises 16 pounds of black-pigmented 35 mesh resin, which would be added to the dropbox in step 403.

Step 404 involves attaching the dropbox to the mold. The drop box port is attached to an access port on the mold. The access port on the mold may have a cover that needs to be removed or slid away to expose the access port. However, the port on the dropbox remains closed during this step.

Step 405 is the first curing phase. This step involves setting the rotational parameters and placing the mold in an oven. In this specific embodiment, the mold is rotated continuously along two axes using a 4:1 ratio or other as needed, meaning that for every 4 times that the mold is rotated around its central axis, it has flipped once end-over-end. This rotational configuration is maintained while the mold is the oven. In this specific embodiment, the mold is placed within a gas oven set to 600° F. The duration of curing phase one is based on the properties of the mold, and the resin properties including, but not limited to, pigmentation and weight. In a specific embodiment, curing phase one has a duration of approximately 16 minutes. During curing phase one, the first resin should soften and coat the inner surface of the mold. The second resin inside the dropbox should remain relatively cool because of the insulation of the dropbox.

Step 406 involves opening the release mechanism on the dropbox, which opens the port on the dropbox. Once the dropbox is opened, the second resin will begin to flow from the dropbox through the access port on the mold into the interior of the developing plastic structure. Step 406 may involve briefly slowing down the rotation and/or removing the mold from the oven just long enough to open the dropbox port. In some cases, the dropbox release is spring-loaded or air opened to minimize any interruption of the normal curing process. Once Step 406 is complete, the second curing phase can begin.

Step 407 is the second curing phase and involves curing the plastic structure to completion. In the case of the first resin, curing phase two is a continuation of the first curing phase. In the case of the second resin, the second curing phase is the continuation. In this embodiment, the same parameters as the first curing phase are maintained, which means rotating with a 4:1 ratio at a temperature of roughly 600° F. The duration of curing phase two also is based on the properties of the first and second resins. In this embodiment, the second resin comprises of 16 pounds of black resin which translates to a second curing phase lasting approximately 15 minutes. Once the second curing phase has completed, the first resin and second resin should have formed a two-layer wall like the one illustrated in FIG. 2. In this specific embodiment, the durations of curing phase one and curing phase two are roughly the same. However, this may not be the case when different resin or mold configurations are used.

Step 408 involves removing the mold from the oven and cooling it to a temperature where the polyethylene resin will cease to flow. Until the mold has sufficiently cooled, its rotational parameters will be maintained. Step 408 may involve the use of fans and water mist to accelerate the cooling of the mold.

Step 409 involves removing the plastic structure from the mold. The mold is opened and a two-layer tank is extracted from the mold. In this embodiment, the extracted tank should roughly resemble FIG. 1. The actual thickness of the wall layers is based on the quantity of resin used to form each layer. In this embodiment, 44 pounds of white-pigmented resin was used for the outer layer and 16 pounds of black-pigmented resin was used for the inner layer. Accordingly, the outer layer should be thicker than the inner layer.

Figure 5:
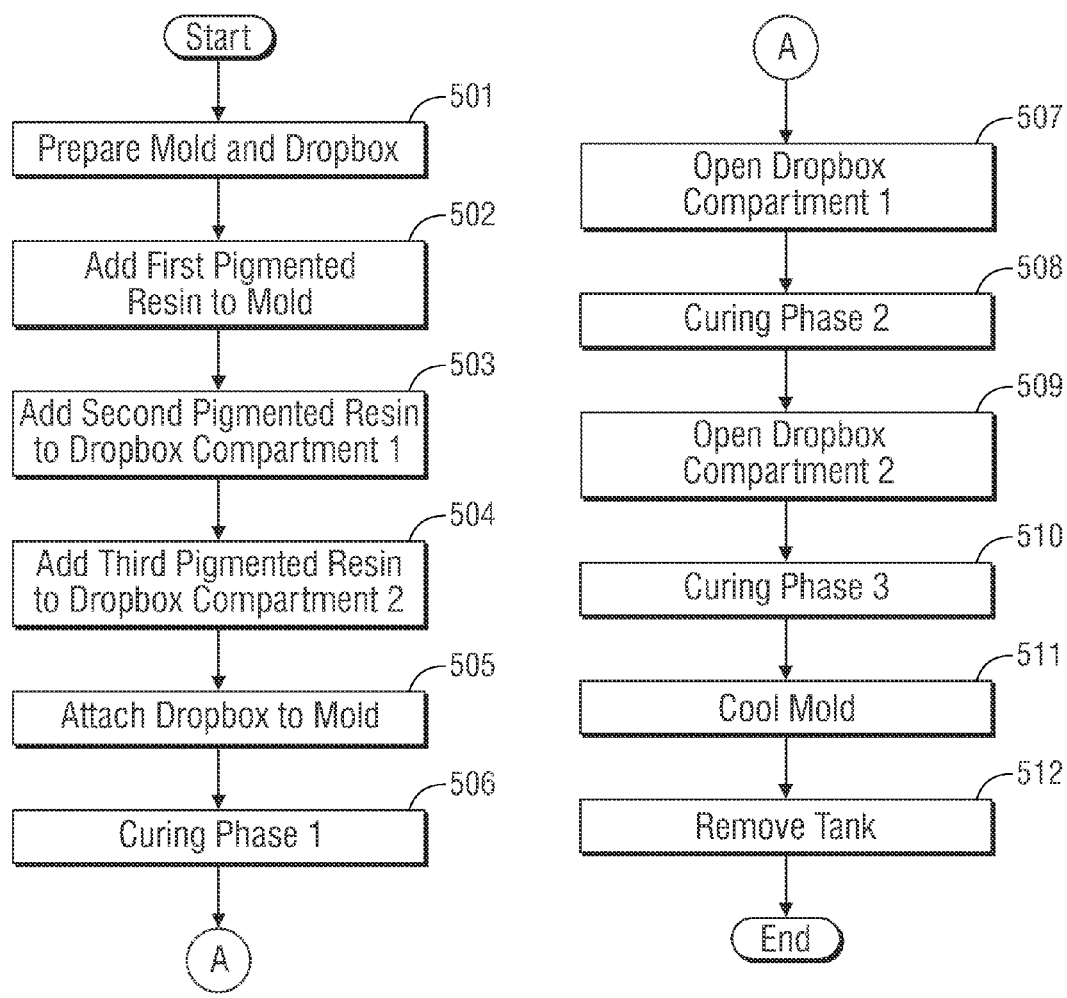
FIG. 5 is a diagram illustrating the steps necessary to manufacture a three-layer storage tank.

FIG. 5 illustrates a process that can be used to construct a multilayer storage tank such as 100. Specifically, FIG. 5 describes steps in the process of producing a three-layer water tank. The process used in the three-layer process is similar to the process used in the two-layer process, so it will discussed in terms of differences from the two-layer process discussed above and illustrated in FIG. 4. By way of example and not limitation, the steps shown in FIG. 5 will be discussed in the context of producing a 100-gallon tank of the type of shown in FIG. 1 with a white-pigmented polyethylene outer layer, a pigmented polyethylene foam middle layer, and a black-pigmented polyethylene inner layer. The values, equipment, configurations and materials discussed below are examples and do not define the scope of this patent, which is defined by the claims. Based on this disclosure, a skilled artisan could apply this technique to different colors of resin, different resin powder size, different tank shapes, different tank sizes, and different layer compositions without undue experimentation.

Step 501 is very similar to step 401. However, the dropbox used in the process of three-layer process contains two compartments as opposed to the dropbox used in the two-layer process which may contain only one compartment. Therefore, step 501 includes preparing both compartments of the dropbox.

Step 502 is similar to step 402 in that the resin that will form the outer layer is added directly to the mold. In this specific embodiment, the first resin comprises of 44 pounds of white-pigmented 35 mesh polyethylene resin.

Steps 503 and 504 are similar to step 403 in that resin will be added to a dropbox. However, it is important to note that the second resin referenced in step 503 is the resin that will form the middle layer of the resulting water tank and not the inner layer as in step 403. In this specific embodiment, the second resin comprises 10 pounds of white-pigmented polyethylene foam resin. By "foam resin", this means that the resin contains a foaming (blowing) agent that will cause this resin to produce polyethylene foam during the curing process. The resin added in step 504 corresponds to the resin added in step 403 of the two-layer process in that they both involve the resin that will form the inner layer. Of course, step 504 involves a second compartment that may not be present in the two-layer process. In this specific embodiment, the third resin comprises 10 pounds of black-pigmented polyethylene resin.

Step 505 is similar to Step 404 in that they both involve attaching a dropbox to a mold. However, the dropbox used in step 505 contains two ports, so the attachment process may involve the use of multiple access ports on the mold.

Steps 506, 507, and 508 roughly correspond to steps 405, 406, and 407. Because the dropbox used step 505 has two ports, only a single port is opened in step 507. Steps 509 and 510 are additional steps that relate to adding the third resin and utilizing a third curing phase. Step 509, where the second dropbox compartment is opened, should be substantially similar to step 507, where the first dropbox compartment is opened. Steps 506, 508, 510 are curing periods separated by the addition of resin to the mold. In this specific embodiment, all curing phases occur at 600° F. or other needed temperature, wherein the first curing phase 506 has a duration of 16 minutes, the second curing phase 508 has a duration of 10 minutes, and the third curing phase 510 also has a duration of 10 minutes. As with the two-layer variation, the three layers should cure together.

Steps 511 and 512 are essentially the same as steps 408 and 409 in that the mold should be cooled before removing the completed plastic structure. In this specific embodiment, the result should be a water tank which resembles water tank 100 in FIG. 1, with a three-layer wall structure similar to what is shown in FIG. 3.

The various curing times and rotational parameters can be altered by a skilled artisan to account for the use of different materials that may have different curing times. The principles discussed above apply when using other plastic materials. For example, a nylon outer layer takes longer time to cure than an equivalent polyethylene outer layer. Accordingly, the duration of curing phase one would need to be extended to account for this property of nylon. A skilled artisan could make the adjustment necessary to account for different materials, different pigments, different powder sizes, and different molds.

Figure 6A:
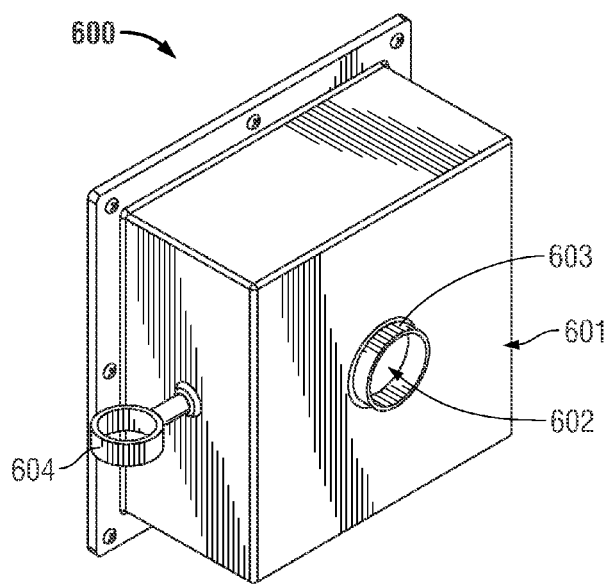
FIG. 6A is a diagram of a single-port dropbox.

FIG. 6A illustrates a single port dropbox 600 that might be used in producing a two-layer tank. Dropbox 600 has an outer surface 601 and an inner surface 602. Between the outer surface 601 and inner surface 602 is layer of insulation, which may include, but is not limited to Teflon. The surfaces themselves may also have insulating properties. The overall insulation needs to be sufficient to keep the contents of dropbox 600 from curing within the dropbox. Dropbox 600 contains a port 603 that will connect to a corresponding access port on a mold 101 (shown in FIG. 6B). Port 603 contains a plug which is connected to release handle 604. The plug in port 603 will remain closed until such time as release handle 604 is activated. In some embodiments, release handle 604 is spring loaded, such that it need only be pulled to activate.

Figure 6B:
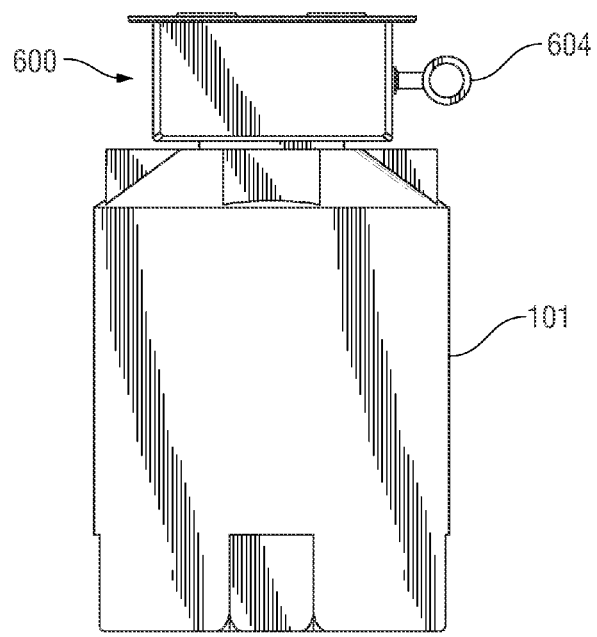
FIG. 6B is a diagram illustrating a single-port dropbox attached to a mold.

FIG. 6B illustrates a dropbox 600 that has been attached to mold 101. The dropbox is attached securely to mold 101 because it will stay attached to the mold throughout the entire curing process. Release mechanism 604 is readily accessible so that it can be activated with as little disruption to the curing process as possible or by other means like pneumatic release.

Figure 7A:
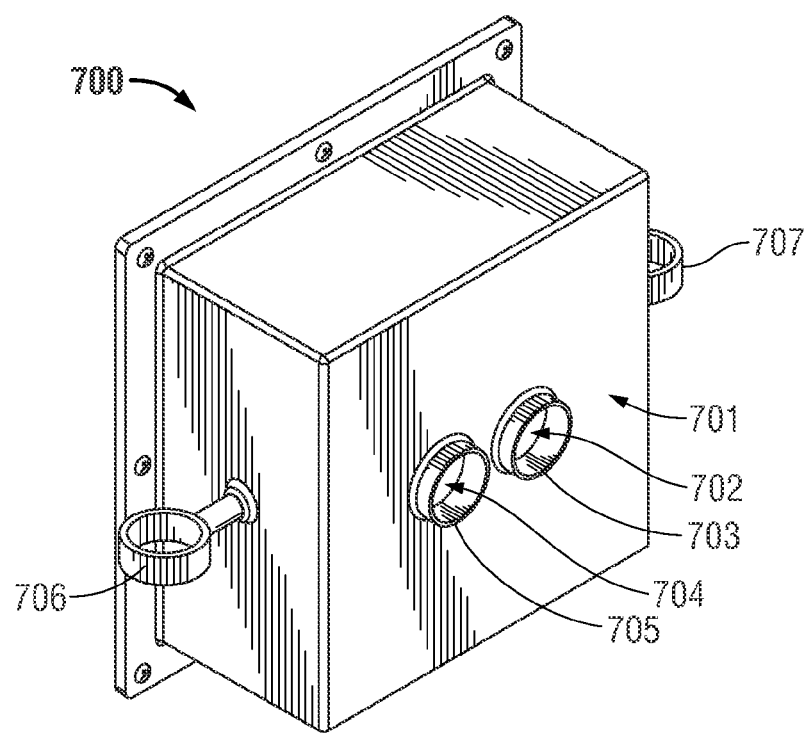
FIGS. 7A and 7B are diagrams of a dual-port dropbox.
Figure 7B:
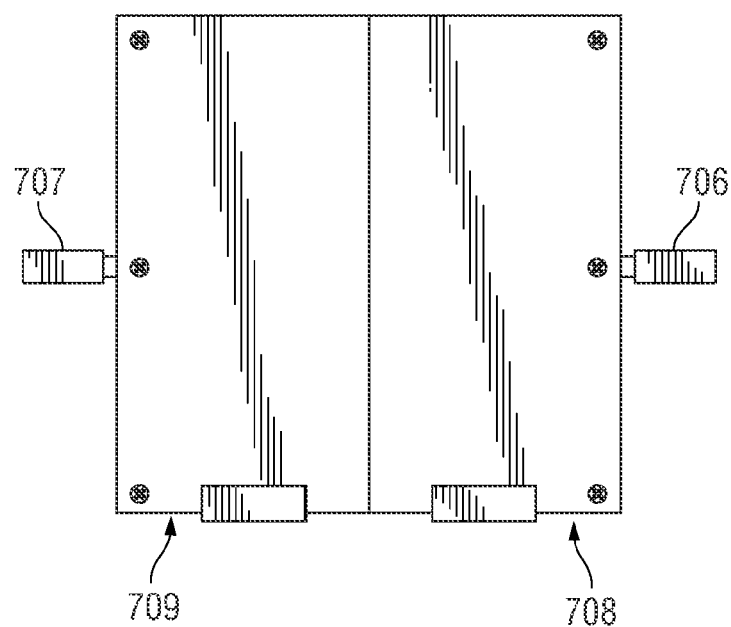

FIGS. 7A and 7B illustrate a dual port dropbox 700 that might be used in producing a three-layer tank. Dropbox 700 has an outer surface 701 and two inner surfaces 702 and 704, two ports 703 and 705, and two release mechanism 706 and 707. Dropbox 700 contains two compartments 708 and 709. Inner surface 704, port 705 and release mechanism 706 correspond to compartment 708. Inner surface 702, port 703 and release mechanism 707 corresponding to compartment 709. Similar to dropbox 600, dropbox 700 should have insulation between its outer surface 701 and its two inner surfaces 702 and 704. In addition, surfaces 702 and 704 should be insulated from each other because one compartment may be opened for a substantial period of time before the other compartment is opened.

Dropbox 700 can be attached to a mold 101 in a similar manner as dropbox 600. However, mold 101 will need to have dual access ports to take full advantage of the dual port capability of dropbox 700. The presence of multiple access ports on mold 101 does not preclude the use of dropbox 600 as additional access ports can remain unused. Although dropbox 700 has two compartments, if can be still be used to produce a two-layer structure if only one compartment is used or if both compartments are used in tandem.

Although the above example is described in the context of a water storage tank which inhibits algae growth, a resulting two-layer tank may be used for other purposes or in other applications.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An insulated water storage tank comprising:
an opaque polyethylene inner layer;
a middle layer comprised from white pigmented closed cell polyethylene foam;
a non-opaque outer layer;
wherein the water storage tank is adapted to inhibit the growth of algae and insulate water contained therein from ambient thermal conditions in which the tank is disposed.

2. The water storage tank of claim 1,
wherein the opaque polyethylene inner layer is black.

3. The water storage tank of claim 1,
wherein the non-opaque outer layer comprises nylon.

4. The water storage tank of claim 1,
wherein the non-opaque outer layer comprises polypropylene.

5. The water storage tank of claim 1,
wherein the non-opaque outer layer comprises crosslink polyethylene.

6. The water storage tank of claim 1,
wherein the non-opaque outer layer comprises polyurethane.

7. The water storage tank of claim 1 in which the non-opaque outer layer comprises polyethylene.

* * * * *